United States Patent
Kade et al.

(10) Patent No.: US 11,042,931 B2
(45) Date of Patent: Jun. 22, 2021

(54) INTRADAY RESOURCE MANAGEMENT SYSTEM

(71) Applicant: The Toronto-Dominion Bank, Toronto (CA)

(72) Inventors: Carlos Alejandro Kade, Toronto (CA); Anne Marie Morissette, Toronto (CA); Vijay Kumar, Mississauga (CA); Caroline Bandiera, Toronto (CA); Adriann Teresa Coe, Pickering (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/293,979

(22) Filed: Mar. 6, 2019

(65) Prior Publication Data
US 2020/0286163 A1 Sep. 10, 2020

(51) Int. Cl.
*G06Q 40/02* (2012.01)
*H04L 29/06* (2006.01)

(52) U.S. Cl.
CPC ......... *G06Q 40/02* (2013.01); *H04L 63/0876* (2013.01)

(58) Field of Classification Search
CPC .................................................... G06Q 40/02
See application file for complete search history.

(56) References Cited

U.S. PATENT DOCUMENTS

| 7,308,428 B1* | 12/2007 | Federspiel | G06Q 40/00 705/35 |
| 7,356,770 B1 | 4/2008 | Jackson | |
| 8,074,873 B1 | 12/2011 | Finkemeier et al. | |
| 8,190,504 B1 | 5/2012 | Stolz et al. | |
| 8,725,609 B2 | 5/2014 | Pawelczyk et al. | |
| 9,058,627 B1* | 6/2015 | Wasser | G06F 3/0488 |

(Continued)

FOREIGN PATENT DOCUMENTS

CN  106886944  7/2017

OTHER PUBLICATIONS

USPTO: US Office Action relating to U.S. Appl. No. 16/294,001, dated Sep. 3, 2020.

(Continued)

*Primary Examiner* — Scott C Anderson
(74) *Attorney, Agent, or Firm* — Rowand LLP

(57) ABSTRACT

Computer systems and methods for managing resources are described. In an aspect, a method includes: providing, to a client device associated with an authenticated entity, an intraday resource availability interface that includes a resource usage graph having a time axis including a time period and a resource availability indicator indicating a total amount of resources over the time period, including borrowed resources, available for use in association with the one or more account, wherein the intraday resource availability interface includes a widget configured to accept input to modify a parameter affecting the resource usage graph; detecting a transfer of value associated with the one or more account; determining an updated available resource amount based on the detected transfer of value; and sending, to the client device, an updated resource availability interface, the updated resource availability interface including an updated resource availability indicator based on the determined updated available resource amount.

20 Claims, 9 Drawing Sheets

(56) References Cited

U.S. PATENT DOCUMENTS

| | | |
|---|---|---|
| 9,135,661 B2 | 9/2015 | Chacko et al. |
| 10,354,325 B1* | 7/2019 | Skala ..................... G06Q 40/04 |
| 2002/0069082 A1 | 6/2002 | Choe et al. |
| 2007/0127527 A1 | 6/2007 | Dan et al. |
| 2008/0183639 A1 | 7/2008 | Disalvo |
| 2013/0080641 A1 | 3/2013 | Lui et al. |
| 2013/0110696 A1* | 5/2013 | Jacobs ................... G06Q 40/04 |
| | | 705/37 |
| 2014/0046716 A1 | 2/2014 | Black et al. |
| 2014/0279398 A1 | 9/2014 | Stewart et al. |
| 2015/0142622 A1* | 5/2015 | Robertson .............. G06Q 40/12 |
| | | 705/30 |
| 2015/0339765 A1 | 11/2015 | Dubey et al. |
| 2015/0379644 A1* | 12/2015 | Danielak .............. G06Q 20/108 |
| | | 705/36 R |
| 2016/0072730 A1 | 3/2016 | Jubran et al. |
| 2016/0247228 A1* | 8/2016 | Connolly ................ G06Q 40/06 |
| 2017/0070575 A1 | 3/2017 | Royal et al. |
| 2017/0359230 A1 | 12/2017 | Dintenfass et al. |
| 2018/0174121 A1* | 6/2018 | Denton ................... G06Q 20/10 |
| 2019/0058669 A1 | 2/2019 | Duarte et al. |
| 2019/0073733 A1 | 3/2019 | Steinhardt et al. |
| 2019/0132224 A1* | 5/2019 | Verma ..................... H04L 43/04 |

OTHER PUBLICATIONS

U.S. Office Action relating to U.S. Appl. No. 16/294,001, dated Nov. 27, 2020.

USPTO; U.S. Office Action relating to U.S. Appl. No. 16/427,882; dated Dec. 24, 2020.

\* cited by examiner

FIG. 7

INTRADAY RESOURCE MANAGEMENT SYSTEM

TECHNICAL FIELD

The present disclosure relates to resource management methods and systems and, more particularly, to systems and methods for real-time intraday management of resources.

BACKGROUND

Resources, such as computing resources including memory and processing power and other resources such as tokens or value stores, may be used throughout the course of a day. For example, resources may be transferred for use by other systems or entities and so the total amount of resources may fluctuate throughout the day. Managing such resources to ensure that there is no deficiency in the availability of resources may be difficult, particularly since the availability of resources may change rapidly making it difficult to ascertain the current availability of resources.

Furthermore, since resources may sometimes be pooled, tracking and managing the total amount of resources available at any given time may be difficult.

Additionally, there are few tools for assisting users to ensure that resources do not become overconsumed and to configure resource usage to avoid such shortfalls.

BRIEF DESCRIPTION OF THE DRAWINGS

Embodiments are described in detail below, with reference to the following drawings:

FIG. 7 is a further example display screen of an interface in accordance with an example embodiment;

Like reference numerals are used in the drawings to denote like elements and features.

DETAILED DESCRIPTION OF VARIOUS EMBODIMENTS

Figure 1:
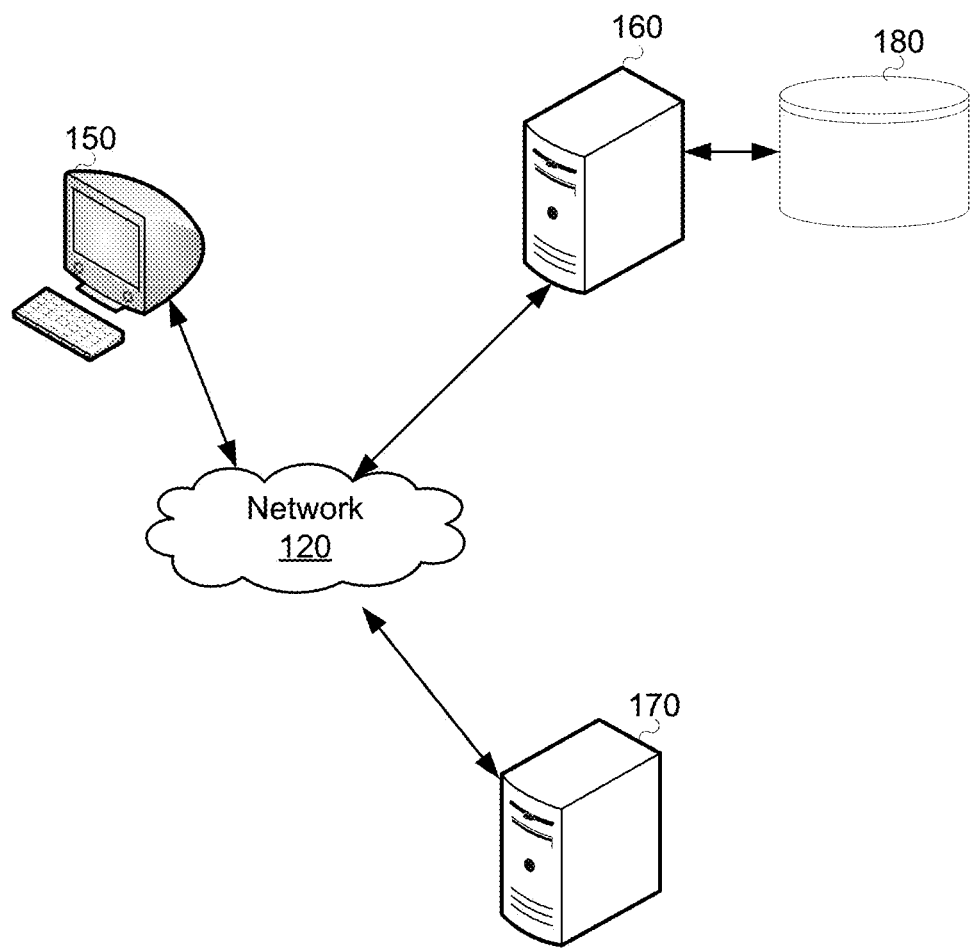
FIG. 1 is a schematic operation diagram illustrating an operating environment of an example embodiment.

Computer-based tools for managing resources are described. More particularly, methods and computer systems, such as server computing systems, which provide management tools are described.

In an aspect, the present application describes a server computer system. The server computer system may include a communications module, a processor coupled to the communications module and a memory storing processor-executable instructions which, when executed, configure the processor to: provide, via the communications module and to a client device associated with an authenticated entity, an intraday resource availability interface, the intraday resource availability interface including a resource usage graph for one or more account associated with the authenticated entity, the resource usage graph having a time axis including a time period that includes a day start time and a current time, the resource usage graph including a resource availability indicator indicating a total amount of resources over the time period, including borrowed resources, available for use in association with the one or more account, wherein the intraday resource availability interface includes a widget configured to accept input to modify a parameter affecting the resource usage graph; detect a transfer of value associated with the one or more account; determine an updated available resource amount based on the detected transfer of value; and send, via the communications module and to the client device, an updated resource availability interface, the updated resource availability interface including an updated resource availability indicator based on the determined updated available resource amount.

In some implementations, the widget may be configured to accept input to suppress display of the resource availability indicator. In some implementations, the widget may be configured to accept input to modify a displayed time period associated with the resource usage graph.

In some implementations, the widget may be configured to accept input to reserve a portion of the borrowed resources and the instructions may further configure the processor to: receive, via the communications module and from the client device, a command to reserve a portion of the borrowed resources, the command sent from the client device to the server computer system responsive to input received through the widget; determine a further updated available resource amount based on the reserved portion of the borrowed resources; and send, via the communications module and to the client device, a further updated resource availability interface, the further updated resource availability interface including a further updated resource availability indicator based on the further updated available resource amount.

In some implementations, the intraday resource availability interface may further include a current resource availability summary displayed together with the resource usage graph. The current resource availability summary may display a current available resource amount. The current resource availability summary may include a current borrowed resource limit indicator indicating a current borrowed resource threshold.

In some implementations, the resource usage graph may further include a borrowed resource limit indicator indicating a borrowed resource threshold over the time period.

In some implementations, the widget may be configured to receive input to send at least some data represented on the intraday resource availability interface and the instructions may further configure the processor to: receive, via the communications module and from the client device, a signal representing a command to send the at least some data; and send a message containing the at least some data.

In some implementations, the instructions may further configure the processor to: monitor a net credit position based on intraday transfers into and out of the one or more account; detect an intraday peak net credit position; and send, via the communications module and to the client device, a further updated resource availability interface, the further updated resource availability interface including the detected intraday peak net credit position.

In some implementations, the instructions may further configure the processor to: monitor a net debit position based on intraday transfers into and out of the one or more account; detect an intraday peak net debit position; and send, via the communications module and to the client device, a further updated resource availability interface, the further updated resource availability interface including the detected intraday peak net debit position.

In another aspect, a method is described. The method may be performed by a server. The method may include: providing, to a client device associated with an authenticated entity, an intraday resource availability interface, the intraday resource availability interface including a resource usage graph for one or more account associated with the authenticated entity, the resource usage graph having a time axis including a time period that includes a day start time and a current time, the resource usage graph including a resource availability indicator indicating a total amount of resources over the time period, including borrowed resources, available for use in association with the one or more account, wherein the intraday resource availability interface includes a widget configured to accept input to modify a parameter affecting the resource usage graph; detecting a transfer of value associated with the one or more account; determining an updated available resource amount based on the detected transfer of value; and sending, to the client device, an updated resource availability interface, the updated resource availability interface including an updated resource availability indicator based on the determined updated available resource amount.

In some implementations, the widget may be configured to accept input to suppress display of the resource availability indicator.

In some implementations, the widget may be configured to accept input to modify a displayed time period associated with the resource usage graph.

In some implementations, the widget may be configured to accept input to reserve a portion of the borrowed resources and the method may further include: receiving, via the communications module and from the client device, a command to reserve a portion of the borrowed resources, the command sent from the client device to the server computer system responsive to input received through the widget; determining a further updated available resource amount based on the reserved portion of the borrowed resources; and sending, to the client device, a further updated resource availability interface, the further updated resource availability interface including a further updated resource availability indicator based on the further updated available resource amount.

In some implementations, the intraday resource availability interface may further include a current resource availability summary displayed together with the resource usage graph, the current resource availability summary displaying a current available resource amount.

In some implementations, the current resource availability summary may include a current borrowed resource limit indicator indicating a current borrowed resource threshold.

In some implementations, the resource usage graph may further include a borrowed resource limit indicator indicating a borrowed resource threshold over the time period.

In some implementations, the widget may be configured to receive input to send at least some data represented on the intraday resource availability interface and the method may further include: receiving, from the client device, a signal representing a command to send the at least some data; and sending a message containing the at least some data.

In some implementations, the method may include: monitoring a net credit position based on intraday transfers into and out of the one or more account; detecting an intraday peak net credit position; and sending, to the client device, a further updated resource availability interface, the further updated resource availability interface including the detected intraday peak net credit position.

In another aspect, a non-transitory computer readable storage medium including processor-executable instructions is described. The processor-executable instructions may, when executed, configure a processor to perform a method described herein. For example, the processor-executable instructions may configure the processor to: provide, to a client device associated with an authenticated entity, an intraday resource availability interface, the intraday resource availability interface including a resource usage graph for one or more account associated with the authenticated entity, the resource usage graph having a time axis including a time period that includes a day start time and a current time, the resource usage graph including a resource availability indicator indicating a total amount of resources over the time period, including borrowed resources, available for use in association with the one or more account, wherein the intraday resource availability interface includes a widget configured to accept input to modify a parameter affecting the resource usage graph; detect a transfer of value associated with the one or more account; determine an updated available resource amount based on the detected transfer of value; and send, to the client device, an updated resource availability interface, the updated resource availability interface including an updated resource availability indicator based on the determined updated available resource amount.

In another aspect, a server computer system is described. The server computer system may include a communications module, a processor coupled to the communications module, and a memory storing processor-executable instructions which, when executed, configure the processor to: provide, via the communications module and to a client device associated with an authenticated entity, an intraday transfer interface identifying a plurality of intraday transfers for the authenticated entity; receive, via the communications module and from the client device, a signal representing a command input through the intraday transfer interface, the command associated with a processing condition for at least one of the plurality of intraday transfers; configure the at least one of the plurality of intraday transfers to be processed based on the processing condition; and provide, via the communication module and to the client device, an updated intraday transfer interface indicating processing of the at least one of the plurality of intraday transfers according to the processing condition.

In some implementations, the updated intraday transfer interface may provide a selectable option to remove the processing condition.

In some implementations, the command may be or include a defer command and the processing condition may cause the at least one of the plurality of intraday transfers to be suspended and the selectable option to remove the processing condition may be a selectable option to input a release command that removes such suspension.

In some implementations, the command may be a prioritization command and the processing condition may specify a processing priority of the at least one of the plurality of intraday transfers, and configuring the at least one of the plurality of intraday transfers to be processed based on the processing condition may include configuring the at least one of the plurality of intraday transfers to be processed according to the specified processing priority.

In some implementations, the command may define the processing condition and the processing condition may include a threshold and an action, and configuring the at least one of the plurality of intraday transfers to be processed based on the processing condition may include, for at least one of the plurality of intraday transfers, comparing a value associated with that intraday transfer to the threshold and, based on the comparison, selectively configuring that intraday transfer to be processed according to the action.

In some implementations, the command may define the processing condition and the processing condition may include transfer identification information for identifying affected intraday transfers and an action to be applied to the affected intraday transfers and configuring the at least one of the plurality of intraday transfers to be processed based on the processing condition may include: for at least one of the plurality of intraday transfers, determining, based on the transfer identification information, that the action is to be applied to that intraday transfer; and in response to determining that the action is to be applied to that intraday transfer, configuring that intraday transfer based on the action. In some implementations, the action may be a defer command. In some implementations, the action may configure a processing priority.

In some implementations, determining, based on the transfer identification information, that the action is to be applied to that intraday transfer includes comparing at least a portion of a reference number for the intraday transfer with the transfer identification information.

In some implementations, the authenticated entity may be associated with an account having a record in a database and the record may reflect a borrowed resource balance, and the command may be or include an earmark command and configuring the at least one of the plurality of intraday transfers to be processed based on the processing condition may include, configuring the borrowed resource balance to reserve at least a portion of the borrowed resource balance for the at least one of the plurality of intraday transfers.

In another aspect, a method is described. The method may be performed at a server. The method may include: providing, to a client device associated with an authenticated entity, an intraday transfer interface identifying a plurality of intraday transfers for the authenticated entity; receiving, from the client device, a signal representing a command input through the intraday transfer interface, the command associated with a processing condition for at least one of the plurality of intraday transfers; configuring the at least one of the plurality of intraday transfers to be processed based on the processing condition; and providing, to the client device, an updated intraday transfer interface indicating processing of the at least one of the plurality of intraday transfers according to the processing condition.

In some implementations, the updated intraday transfer interface may provide a selectable option to remove the processing condition.

In some implementations, the command may be or include a defer command and the processing condition may cause the at least one of the plurality of intraday transfers to be suspended and the selectable option to remove the processing condition may be or include a selectable option to input a release command that removes such suspension.

In some implementations, the command may be or include a prioritization command and the processing condition may specify a processing priority of the at least one of the plurality of intraday transfers, and configuring the at least one of the plurality of intraday transfers to be processed based on the processing condition may include configuring the at least one of the plurality of intraday transfers to be processed according to the specified processing priority.

In some implementations, the command may define the processing condition and the processing condition may include a threshold and an action, and configuring the at least one of the plurality of intraday transfers to be processed based on the processing condition may include: for at least one of the plurality of intraday transfers, comparing a value associated with that intraday transfer to the threshold and, based on the comparison, selectively configuring that intraday transfer to be processed according to the action.

In some implementations, the command may define the processing condition and the processing condition may include transfer identification information for identifying affected intraday transfers and an action to be applied to the affected intraday transfers and configuring the at least one of the plurality of intraday transfers to be processed based on the processing condition may include: for at least one of the plurality of intraday transfers, determining, based on the transfer identification information, that the action is to be applied to that intraday transfer; and in response to determining that the action is to be applied to that intraday transfer, configuring that intraday transfer based on the action. In some implementations, the action may be or include a defer command. In some implementations, the action may configure a processing priority.

In some implementations, determining, based on the transfer identification information, that the action is to be applied to that intraday transfer may include comparing at least a portion of a reference number for the intraday transfer with the transfer identification information.

In another aspect, a non-transitory computer readable storage medium including processor-executable instructions is described. The processor-executable instructions may, when executed, configure a processor to perform a method described herein. For example, the processor-executable instructions may configure the processor to: provide, to a client device associated with an authenticated entity, an intraday transfer interface identifying a plurality of intraday transfers for the authenticated entity; receive, from the client device, a signal representing a command input through the intraday transfer interface, the command associated with a processing condition for at least one of the plurality of intraday transfers; configure the at least one of the plurality of intraday transfers to be processed based on the processing condition; and provide, to the client device, an updated intraday transfer interface indicating processing of the at least one of the plurality of intraday transfers according to the processing condition.

In a further aspect, there is provided a non-transitory computer readable storage medium including processor-executable instructions which, when executed, configure a processor to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a server 160 (which may also be referred to as a server computer system) and a client device 150 communicate via a network 120. The client device 150 is a computing device that may be associated with an entity, such as a user or client, having resources associated with the server 160. For example, the server 160 may track, manage, maintain, and/or lend resources to the entity. The resources may, for example, be computing resources, such as memory or processor cycles. By way of further example, the resources may include stored value, such as fiat currency, which may be represented in a database. For example, the server 160 may be coupled to a database 180, which may be provided in secure storage. The secure storage may be provided internally within the server 160 or externally. The secure storage may, for example, be provided remotely from the server 160. For example, the secure storage may include one or more data centers. The data centers may, for example, store data with bank-grade security.

The database 180 may include records for a plurality of accounts and at least some of the records may define a quantity of resources. For example, the entity that is associated with the client device 150 may be associated with an account having one or more records in the database. The records may reflect a quantity of stored resources that are associated with the entity. Such resources may include owned resources and, in at least some embodiments, borrowed resources. The resources that are associated with an entity may be grouped into various buckets. Some such buckets may, for example, represent individual bank accounts. For example, an entity may be associated with one or more bank accounts. At least some of the resources may be borrowed resources. The borrowed resources may, for example, represent an amount of credit that is available to the entity.

The entity that is associated with the client device 150 and the account may be a customer of a financial institution which operates or manages the server 160. The financial institution may, for example, offer correspondent banking services to the entity. A correspondent bank is a bank that provides services on behalf of another financial institution. For example, the entity may be a financial institution that operates in a jurisdiction that is different than the jurisdiction in which the financial institution operates. By way of example, the financial institution may operate within Canada and the entity may be a financial institution that is foreign to Canada. For example, the entity may be a United States bank. The entity may rely upon the financial institution and, in particular, the server 160, for facilitating wire transfers, conducting transactions, accepting deposits, etc. within a country in which the entity does not operate directly. All such operations may be considered transfers.

The amount of credit that is available to the entity as reflected in the database 180 may be defined by the financial institution that operates the server 160. For example, the server 160 may communicate with an administrator device 170. The administrator device 170 is a computing device that may be operated by an administrator associated with the financial institution. The administrator may login to the server 160 and may then define a credit limit that is to be associated with the entity. The credit limit represents an amount of borrowed resources that the entity will be permitted to use. During the course of a day, the entity may use and obtain additional resources as transactions (both incoming and outgoing) are processed. At various points throughout the day, the owned resources for an entity may fall below zero and the entity may then begin to use borrowed resources.

Accordingly, the administrator device 170 may be used to vary administrator settings such as the total amount of borrowed resources that are available to the entity. An administrator may, for example, modify the credit limit in response to market conditions. For example, if a recent event suggests that the entity may have an inability to return borrowed resources, the administrator may reduce the amount of resources available for borrowing by using the administrator device 170 to configure the server 160 to reduce the amount of credit available.

The client device 150, the server 160 and the administrator device 170 may be in geographically disparate locations. Put differently, the client device 150 may be remote from the server 160 and the server 160 may be remote from the administrator device 170.

The client device 150, the server 160 and the administrator device 170 are computer systems. The client device 150 and/or the administrator device 170 may take a variety of forms including, for example, a mobile communication device such as a smartphone, a tablet computer, a wearable computer such as a head-mounted display or smartwatch, a laptop or desktop computer, or a computing device of another type.

The client device 150 may communicate with the server 160 via the network 120 in order to manage the use of resources. For example, the client device 150 may access the server to access a graphical user interface for viewing resource status and/or for managing the user of resources.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
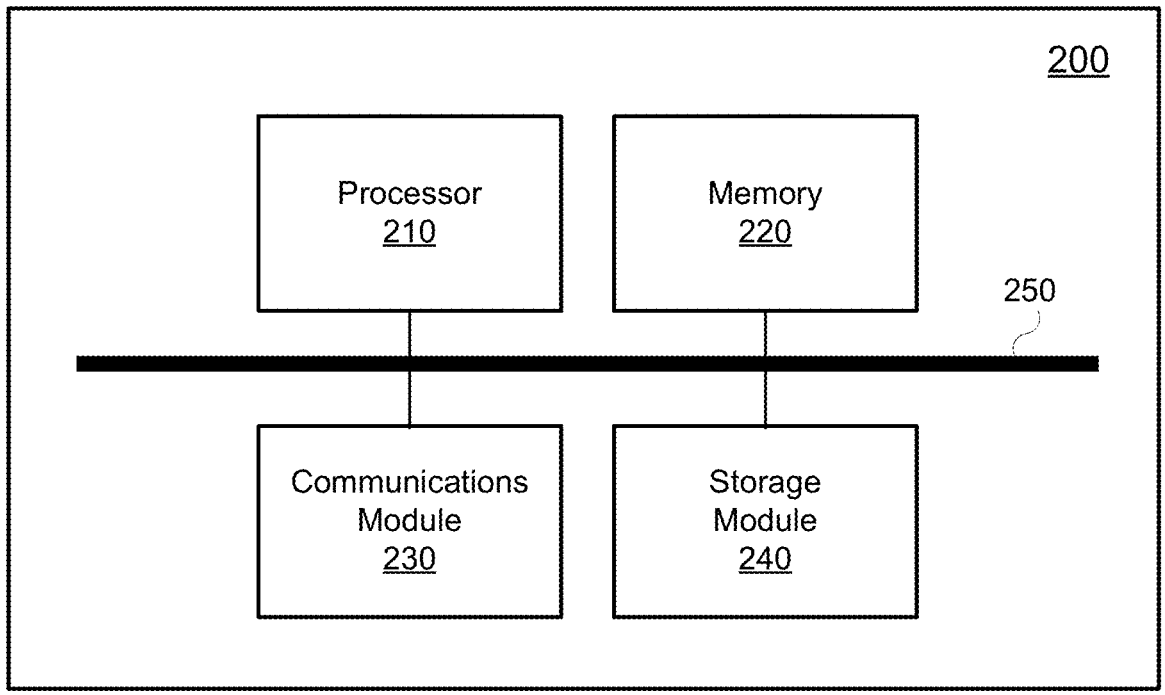
FIG. 2 is high-level schematic diagram of an example computing device.

The client device 150, the server 160 and the administrator device 170 are computing devices. Referring now to FIG. 2, a high-level operation diagram of an example computing device 200 will now be described. The example computing device 200 may be exemplary of the client device 150, the server 160 and/or the administrator device 170.

The example computing device 200 includes a variety of modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Where the example computing device 200 functions as the server 160 of FIG. 1, the storage module 240 may allow the example computing device 200 to access the secure data in the database 180.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

The computing device 200 will include other components apart from those illustrated in FIG. 2 and the specific component set may differ based on whether the computing device 200 is operating as the client device 150, the server 160, or the administrator device 170. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Figure 3:
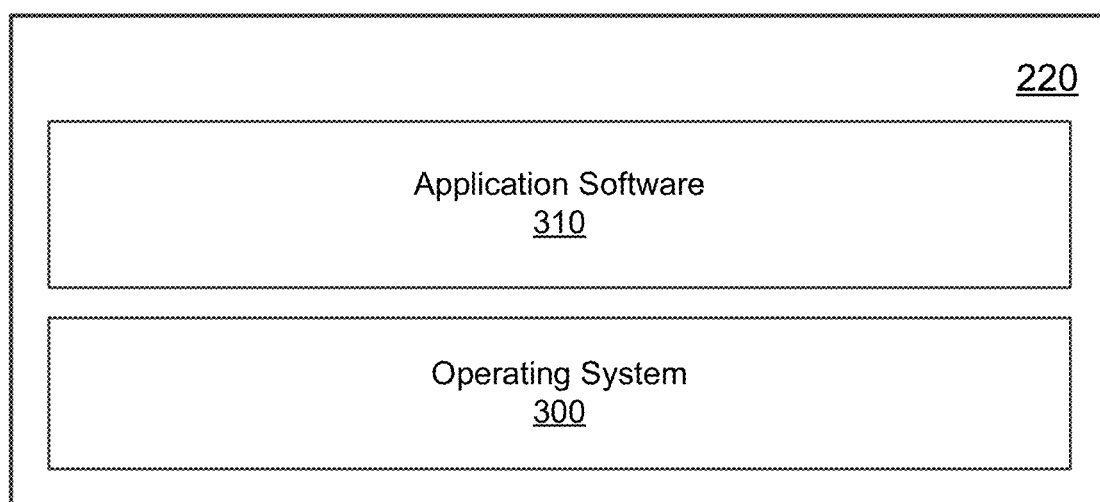
FIG. 3 shows a simplified organization of software components stored in a memory of the example computing device of FIG. 2.

FIG. 3 depicts a simplified organization of software components stored in the memory 220 of the example computing device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application 310 adapts the example computing device 200, in combination with the operating system 300, to operate as a device performing a particular function. For example, the application 310 may cooperate with the operating system 300 to adapt a suitable embodiment of the example computing device 200 to operate as the client device 150, the server 160 and/or the administrator device 170.

While a single application 310 is illustrated in FIG. 3, in operation the memory 220 may include more than one application 310 and different applications 310 may perform different operations.

Figure 4:
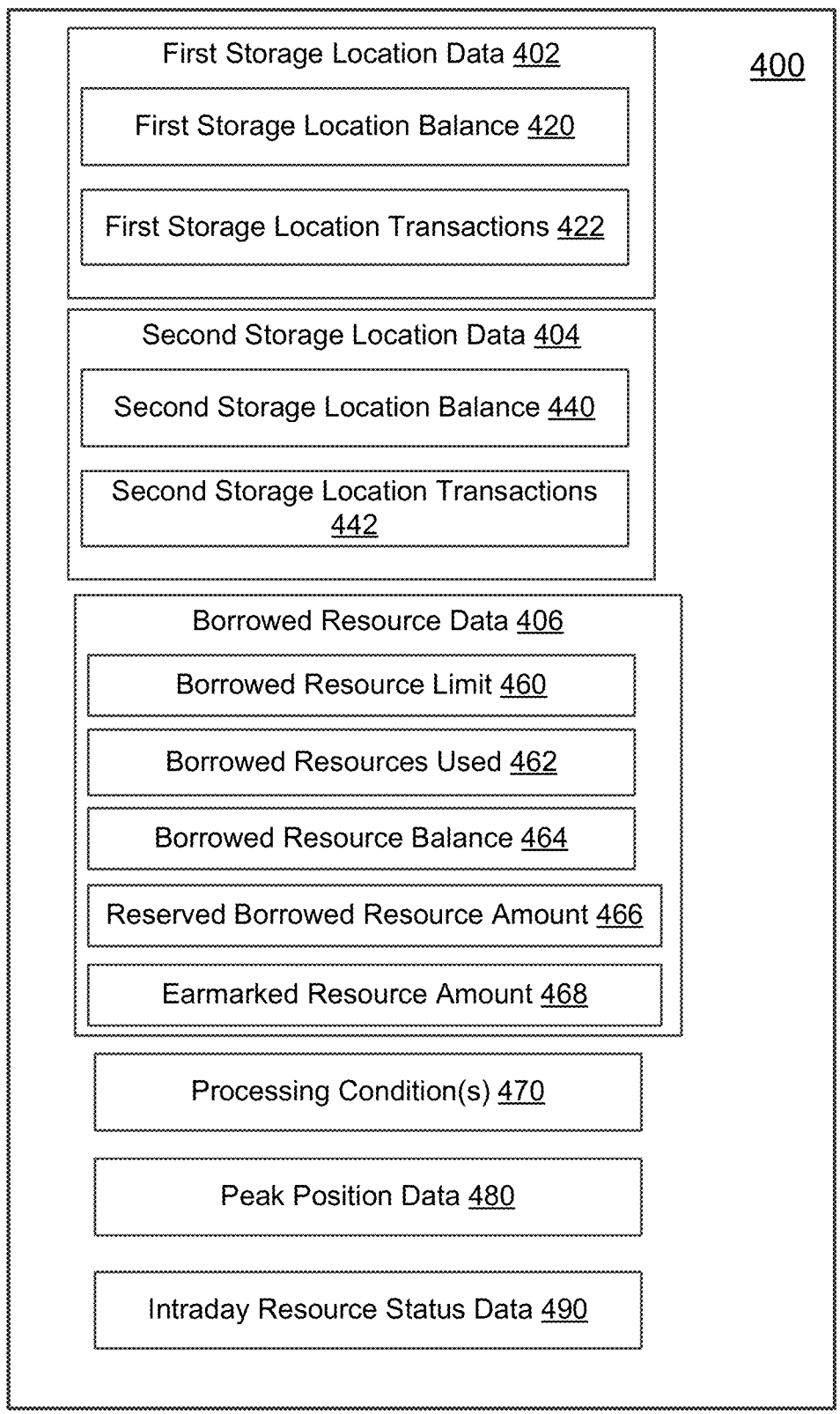
FIG. 4 is a block diagram of an example entity account record.

Reference will now be made to FIG. 4, which illustrates an example record 400 for an entity account. The entity account may, for example, be an account for a foreign financial institution. The record 400 may be stored in the database 180 (FIG. 1). The record 400 may be referred to, for example, as an entity record, an account record, or an entity account record.

The record 400 includes data associated with the entity. For example, the record 400 may include resource availability data. The resource availability data may include data representing resources owned by the entity and/or resources available for borrowing by the entity. The record 400 may include resource availability data for a plurality of storage locations. These storage locations, which may also be referred to as buckets or virtual stores, may represent individual bank accounts that are each associated with the entity. The example record 400 includes first storage location data 402 and second storage location data 404. The first storage location data 402 may represent a first bank account and the second storage location data 404 may represent a second bank account. The first storage location data 402 may include a first storage location balance 420 and first storage location transactions 422. The first storage location balance 420 may represent a current amount of resources stored in, represented by, or otherwise associated with the first storage locations. For example, the first storage location balance 420 may represent a current bank balance for the first storage location.

The first storage location transactions 422 may be a transaction listing for the first storage location. For example, the first storage location transactions 422 may identify completed (i.e., posted), pending (i.e., authorized transactions awaiting completion) and/or scheduled transactions that are associated with the first storage location. Transactions may represent the transfer of resources between records and may also be referred to as transfers. Accordingly, a transaction may also be referred to as a data transfer or an intraday transfer since the transactions may represent transfers for a particular day (e.g., the present day).

The first storage location transactions 422 may represent both incoming and outgoing transactions for the first storage location. Incoming transactions may be referred to as credits whereas outgoing transactions may be referred to as debits. Incoming transactions have an effect of increasing the availability of resources in the first storage location and outgoing transactions have the effect of decreasing the availability of resources in the first storage location. Incoming transactions, therefore, represent the receipt of additional resources, whereas outgoing transactions represent the removal of resources.

The second storage location data 404 also includes a balance (referred to as the second storage location balance 440) and transactions (referred to as the second storage location transactions 442). These are similar to the first storage location balance 420 and the first storage location transactions 422 except that the second storage location balance 440 and the second storage location transactions 442 refer to data associated with the second storage location.

The record 400 also includes borrowed resource data 406. The borrowed resource data includes data regarding borrowed resources. The borrowed resources are resources that are not owned by the entity associated with the record 400 but that are made available to that entity. For example, the borrowed resources may be resources that are owned by an operator of the server 160. The borrowed resource data 406 may include a borrowed resource limit 460. The borrowed resource limit 460 may indicate a threshold. The threshold may be, for example, a maximum amount of borrowed resources that are available to the entity. The threshold may, in at least some embodiments, be a credit limit such as a credit limit that is sometimes referred to as an undisclosed credit limit. The borrowed resource limit 460 may be controlled or configurable by the operator of the server 160 and/or by the server 160 itself. For example, the server 160 may be configured to automatically reduce the borrowed resource limit 460 in response to detecting the occurrence of one or more predetermined trigger conditions. By way of example, the server 160 may automatically monitor electronic media (such as news websites, social media, etc.) and may automatically reduce the borrowed resource limit 460 if a trigger condition occurs which would suggest that the entity may not be able to return any borrowed resources. For example, news articles suggesting that the entity has or is about to file for creditor protection or other relief may cause the server 160 to automatically reduce the borrowed resource limit 460. Alternatively or additionally, the server 160 may reduce (or increase) the borrowed resource limit 460 in response to receiving an instruction to do so from an authenticated administrator device 170.

The borrowed resource data 406 also includes data reflecting borrowed resources used 462. For example, such information may be a total amount of credit that has already been used by the entity.

The borrowed resource data 406 may include a reserved borrowed resource amount 466. The reserved borrowed resource amount 466 may be a quantity that is defined by the entity (e.g., through the client device) which represents an amount of borrowed resources that are not to be used. That is, the reserved borrowed resource amount 466 may represent an amount of resources that are to be set aside and not used (unless the reserved borrowed resource amount 466 is varied to release such resources). The reserved borrowed resource amount 466 may be defined by the client device 150 in response to user input and the reserved borrowed resource amount 466 may be defined for any one of a number of reasons. For example, the server 160 may be configured to dip into the borrowed resource limit 460 (i.e., to borrow resources) whenever insufficient resources are available in the various storage locations (e.g., when the first storage location balance 420 and/or the second storage location balance 440 fall to zero). When borrowed resources are used, however, the entity may be required to, in the future, not only replenish the borrowed resource that were used, but also to transfer a further amount of resources to an account associated with the server 160 (e.g., interest may be required). The entity may prefer to limit the amount of borrowed resources that are used in order to avoid having to transfer such additional resources to the account associated with the server 160 and may, instead, prefer that outgoing transfers be delayed until the storage location balance(s) 420, 440 rise above zero. Additionally or alternatively, the entity may prefer to reserve a portion of the borrowed resource limit 460 for emergencies.

The borrowed resource data 406 may include an earmarked resource amount 468. As will be described in greater detail below, various transactions may be earmarked and earmarking may reserve a portion of the borrowed resource limit 460. The earmarked resource amount 468 may reflect the total number of transactions that have been earmarked.

The borrowed resource data 406 may, alternatively or additionally, include a borrowed resource balance 464. The borrowed resource balance 464 is an amount of borrowed resources that have been made available to the entity that are not yet used. For example, the borrowed resource balance 464 may be the difference between the borrowed resource limit 460 and the current borrowed resources used 462. In at least some embodiments, the borrowed resource balance 464 may be further discounted for the reserved borrowed resource amount 466 and/or the earmarked resource amount 468. For example, in some embodiments, the borrowed resource balance 464 may be determined by subtracting the current borrowed resources used 462, the reserved borrowed resource amount 466 and/or the earmarked resource amount 468 from the borrowed resource limit 460.

While FIG. 4 illustrates the borrowed resource data 406 apart from the first storage location data 402 and the second storage location data 404, in some implementations, the borrowed resource data 406 may be associated with a particular storage location. For example, each storage location may have its own associated borrowed resources.

The record 400 may also include one or more processing conditions 470. Processing conditions may take a variety of forms. By way of example, the processing conditions 470 may include one or more of: a defer processing condition (which may cause processing of one or more associated transfers to be suspended until the defer is released/removed), a prioritization processing condition (which may cause one or more associated transfers to be processed with a higher (or lower as the case may be) relative priority than other transfers not so prioritized), an earmark processing condition (which may cause at least a portion of the borrowed resource limit 460 to be set aside for one or more specified transactions), or a processing condition of another type.

A given one of the processing conditions 470 may be associated with a particular transaction. That is, a processing condition 470 may be linked to particular transaction. The transaction may be an outgoing transaction which is scheduled and/or currently pending. In some implementations, one or more of the processing conditions 470 may be linked to multiple transactions. For example, a processing condition 470 may include transfer identification information for identifying affected intraday transfers and an action that is to be applied to the affected intraday transfers. That is, the processing condition 470 may define a rule that may be used by the server 160 to identify affected transactions. By way of example, the processing condition may include a threshold and an action and the threshold may be used to identify which of the transactions are to be processed according to the action. The action may be, for example, any of the processing conditions recited previously (e.g., a defer processing condition, a prioritization processing condition, an earmark processing condition, or a processing condition of another type). The processing condition may specify a comparison operation associated with the threshold. The comparison operation may, for example, be a greater than (>), less than (<), equal to (==), greater than or equal to (>=), or less than or equal to (<=) operation. By way of example, the processing condition may specify that the action is to apply to any transactions that are greater than the threshold. By way of further example, the processing condition may specify that the action is to apply to any transactions that are less than the threshold.

Other transfer identification information that may be defined for a processing condition 470 and used to identify affected transfers may include, for example, a recipient name, a character string, a reference number, etc. By way of example, a processing condition 470 may specify that any transfers to a certain recipient are to be processed in accordance with a specific action. For example, such transfers may be automatically prioritized as high priority. By way of further example, such transfers may be automatically earmarked. By way of yet further example, such transfers may be automatically deferred.

The processing condition(s) 470 may be defined by the client device 150. That is, the server 160 may update, modify, remove or add a processing condition in response to user input received at the client device 150. Interfaces which facilitate input of processing conditions will be described in greater detail below.

The server 160 is configured to process transactions (i.e., intraday transfers) in accordance with the processing condition(s) 470. By way of example, prioritization may affect processing order such that "higher" priority transactions are processed ahead of "lower" priority transactions. In some implementations, the server 160 may apply special processing rules to transfers of a certain priority. For example, "high" priority transfers may be processed with a white-glove service level such that at every stage of processing, they are specially handled to ensure efficient processing. By way of further example, in some implementations, low priority transfers may not use borrowed resources for processing. Such transfers may only be processed when owned resources are available (e.g., available in the first or send storage locations).

For a defer processing condition, the server 160 may, for example, pause processing of any transaction that is deferred until that transaction is released (i.e., until the deferral is removed). For a transaction that is earmarked, the server 160 may process such a transaction using borrowed resources.

The record 400 may include intraday peak position data 480. The peak position data 480 may include peak credit position data and/or peak debit position data. For example, during the course of a day, the server 160 may automatically monitor inflows and outflows of resources for the account(s). During the day, resources may be received (i.e., credited) and resources may be sent (i.e., debited). The difference between the resources received and the resources sent throughout the day up until the current time is the current net position. When more resources have been received than sent, there is a credit position (indicating that the account balances are increasing) and when more resources have been sent than received, there is a net debit position (indicating that the account balances are decreasing). The peak position data 480 may indicate the maximum credit positions and maximum debit positions on an intraday basis. For example, the peak position data 480 may indicate the amount associated with each maximum and may also reflect a time associated with that maximum. The time may be the amount of time that the net position remained at the associated peak position. The peak position data 480 may include multiple peak credit and peak debit positions. For example, the top five credit positions and the top five debit positions may be stored.

The record 400 may include other data which may generally be referred to as intraday resource status data 490. The intraday resource status data 490 may include historical data representing point in time data throughout the day. That is, the intraday resource status data 490 may indicate various balances or levels of resources at various times throughout the day. The intraday resource status data 490 may, for example, be used by the server 160 when preparing a user interface that includes a resource usage graph, which will be explained in greater detail below.

The record 400 may include more or less data than that illustrated in FIG. 4 and the record 400 may be organized or grouped differently than what is illustrated in FIG. 4. For example, historical transaction data may be separated from upcoming or scheduled transaction data.

Figure 5:
FIG. 5 is a flowchart of an example method in accordance with an example embodiment of the present disclosure.

Operations performed by the client device 150 and the server 160 will be described below with reference to FIGS. 5-10. Referring first to FIG. 5, a flowchart showing example operations is illustrated.

FIG. 5 is a flowchart showing operations performed by a server 160. The operations may be included in a method 500 which may be performed by the server 160. For example, computer-executable instructions stored in memory of the server 160 may, when executed by a processor of the server 160, configure the server 160 to perform the method 500 or a portion thereof.

At operation 501, the server 160 authenticates an entity. For example, the server 160 receives authentication credentials from the client device 150 via a communications module. The authentication credentials may, for example, include one or more of: a username, a password, a personal identification number (PIN), biometric data such as a representation of a fingerprint, or other data that may be used to verify the identity of an operator of the client device 150. The server 160 identifies an account to which the authentication credentials correspond and determines that the authentication credentials are valid before proceeding to subsequent operations 502 to 512 of the method 500. If, instead, the server 160 determines that the authentication credentials are invalid, an error message may be returned to the client device 150 and/or a security action may be taken (such as locking an account after a predetermined number of invalid login attempts).

After the entity has validly authenticated itself with the server 160 at operation 501, the entity may be considered to be an "authenticated entity". The server 160 may then, at operation 502, provide a user interface to the client device 150 via the communications module. For example, the server 160 may provide, via the communications module and to the client device associated with the authenticated entity, an intraday resource availability interface.

Figure 6:
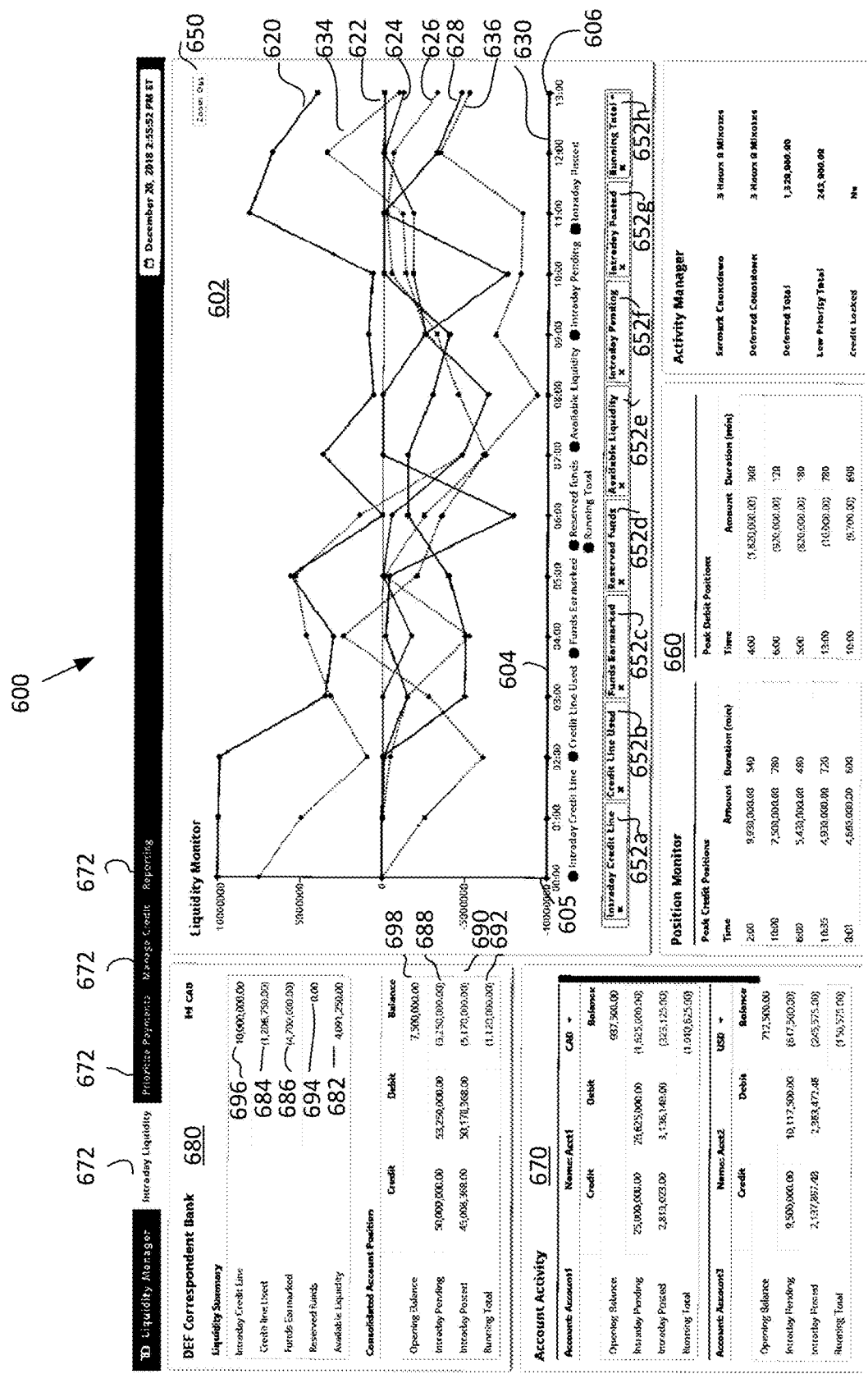
FIG. 6 is an example display screen of an interface in accordance with an example embodiment.

An example intraday resource availability interface 600 is illustrated in FIG. 6. The example resource availability interface 600 includes a resource usage graph 602 for one or more account associated with the authenticated entity. The resource usage graph 602 has a time axis 604 that includes a time period that includes a day start time 605 and a current time 606. In the example illustrated, the time axis 604 is the x-axis and a resource quantum (which may be in units of resources, such as dollars) is the y-axis. The resource usage graph is an intraday graph, illustrating the change in resources over the course of a day.

The resource usage graph 602 includes one or more indicators which, in the example, are in the form of lines. The indicators may include a resource availability indicator 620. The resource availability indicator 620 may be a measure of the total amount of resources available at an associated time. That is, the resource availability indicator indicates a total amount of resources over the time period. The value of the resource availability indicator 620 at any given point represents the quantity of resources available at the time represented by that point. The resource availability indicator may, in at least some implementations, be referred to as the available liquidity.

The resource availability indicator 620 indicates the total amount of resources over the time period, including borrowed resources, which are available for use in association with the one or more account that is associated with the entity. For example, the resource availability indicator may include borrowed resources that are not yet used, reserved, or earmarked (i.e., the borrowed resource balance 464 (FIG. 4)). The resource availability indicator 620 may also be based on the total account balances for all resource storage locations associated with the entity. For example, it may be based on the first and second storage location balances 420, 440 and also based on the borrowed resource balance 464. Accordingly, the resource availability indicator 620 may reflect both owned and borrowed resources that are available for use by the entity in fulfilling outgoing transfers. A location on the resource availability indicator 620 indicates the total amount of resource available at a respective time of the day.

The resource usage graph 602 may include other indicators instead of or in addition to the resource availability indicator 620. For example, the resource usage graph 602 may include a reserved resource indicator 622. The reserved resource indicator 622 indicates the total quantity of resources that have been marked as reserved throughout the day. That is, it may indicate the reserved borrowed resource amount 466 (FIG. 4.). When more resources are reserved, the reserved resource indicator increases whereas when fewer resources are reserved, the reserved resource indicator decreases.

The resource usage graph 602 may include a borrowed resources used indicator 624 which indicates the total quantity of borrowed resources that have been used throughout the day. The current value of the borrowed resources used indicator 624 may correspond to the current borrowed resources used 462 (FIG. 4) and prior values may indicate the borrowed resources used at other times of the day. As more borrowed resources are used, the borrowed resources used indicator 624 increases while, as less borrowed resources are used, the borrowed resources used indicator 624 decreases.

The resource usage graph 602 may include an intraday pending resource transfer indicator 626. The intraday pending resource transfer indicator 626 indicates the net pending resource transfers throughout the day. The net pending resource transfers are based on both incoming transfers and outgoing transfers. The incoming transfers may be referred to as credits whereas the outgoing transfers may be referred to as debits. When the incoming pending resource transfers exceed the outgoing pending resource transfers, the intraday pending resource transfer indicator 626 is positive while it becomes negative when the outgoing pending resource transfers exceed the incoming pending resource transfers. In at least some embodiments, the pending resource transfers may also be reflected in the resource availability indicator 620. That is, the resource availability indicator 620 may be based, in part, on the pending resource transfers.

The resource usage graph 602 may include an earmarked resource indicator 628 which indicates the total amount of resources that have been earmarked at any time during the day.

The resource usage graph 602 may include a borrowed resource limit indicator 630. The borrowed resource limit indicator 630 indicates the total borrowed resource limit throughout the day (i.e., it indicates a borrowed resource threshold, which may be an "undisclosed" credit limit, where "undisclosed" refers to the fact that such a credit limit is not typically disclosed to the entity although the intraday resource availability interface 600 provides disclosure of such a credit limit). In the illustrated example, the total borrowed resource limit did not change at any time during the day (e.g., it remained at 10,000,000.00 throughout the course of the day). However, the total borrowed resource limit could be modified by the administrator device 170.

The resource usage graph 602 may include a running total resource indicator 634. The running total resource indicator 634 may represent the total owned resources (e.g., in the first and second storage locations) when the intraday pending and intraday posted transfers are taken into account. For example, the running total resource indicator 634 may be calculated by adjusting an opening balance for any prior pending or posted transfers during the day. The running total resource indicator 634 begins the day at a level that corresponds to the opening balance and is then adjusted as transactions become pending and posted throughout the day.

The resource usage graph 602 may include an intraday posted resource transfer indicator 636. The intraday posted resource transfer indicator 636 indicates the net posted resource transfers throughout the day. The net posted resource transfers are based on both incoming transfers and outgoing transfers. The incoming transfers may be referred to as credits whereas the outgoing transfers may be referred to as debits. When the incoming posted resource transfers exceed the outgoing posted resource transfers, the intraday posted resource transfer indicator 636 is positive while it becomes negative when the outgoing posted resource transfers exceed the incoming posted resource transfers. In at least some embodiments, the posted resource transfers may also be reflected in the resource availability indicator 620. That is, the resource availability indicator 620 may be based, in part, on the posted resource transfers.

The resource usage graph 602 is a dynamic graph. Notably, the use of computer systems that communicate over a network allow the resource usage graph 602 to be updated in real-time. As the server 160 processes transfers throughout the day, the resource usage graph 602 maintains fresh data. The freshness of the data may allow the entity to input instructions to the server 160 through the intraday resource availability interface 600 based on the current resources. As will be understood following the discussion below, the intraday resource availability interface 600 acts as a man-machine interface to allow the client device 150 to send instructions or commands to the server 160 to vary the server's behaviour based on up-to-date data. Notably, by providing fresh data on the intraday resource availability interface 600, such instructions can be input while they remain valid (since the server 160 continues to process transactions while the intraday resource availability interface 600 is displayed). Further, through the use of computer systems, the intraday resource availability interface 600 may be fresh even though there may be numerous transactions being processed at a time and even though there may be a large geographic separation between the server 160 and the client device 150.

The intraday resource availability interface 600 may include other display features. For example, the intraday resource availability interface 600 may include a current resource availability summary 680. The current resource availability summary 680 may be displayed together with the resource usage graph 602 (i.e., on a common display screen). The current resource availability summary 680 displays current resource indicators including, for example, a current available resource indicator 682 which displays a current resource availability amount. The current available resources indicator 682 indicates a current amount of available resources, both owned and available for borrowing. The current available resource indicator 682 may correspond to the level of the resource availability indicator 620 at the current time.

The current resource availability summary 680 may include other current resource indicators. For example, a current borrowed resources used indicator 684 may indicate a current level of borrowed resources used. The current level of borrowed resources used may, for example, correspond to level of the level of the borrowed resources used indicator 624 at the current time. In the example, the current level of borrowed resources used indicator 684 indicates a negative number. In the example, a negative number is used to indicate that borrowed resources are currently being used. However, the number may instead by a positive number. A positive current level of borrowed resources used may occur when there are unused owned resources. Accordingly, the borrowed resources used indicator 684 may also reflect owned resources in at least some embodiments.

A current earmarked resources indicator 686 may display the current total amount of resources that have been earmarked. The current earmarked resources indicator 686 may correspond to the level of the earmarked resources indicator 628 at the current time. A current intraday pending resource transfer indicator 688 may display the current total amount of pending resource transfers for the day up until the current time. In the example, the current intraday pending resource transfer indicator 688 displays both the current pending credits and the current pending debits and displays a total which is based on the pending credits and debits. The current intraday pending resource transfer indicator 688 may correspond to the level of the intraday pending resource transfer indicator 626 at the current time.

A current intraday posted resource transfer indicator 690 may display the current total amount of posted resource transfers for the day up until the current time. In the example, the current intraday posted resource transfer indicator 690 displays both the current posted credits and the current posted debits and displays a total which is based on the posted credits and debits. The current intraday posted resource transfer indicator 688 may correspond to the level of the intraday posted resource transfer indicator 636 at the current time.

A current running total resource indicator 692 may be used to display a current total of owned resources which accounts for both the current intraday pending and intraday posted transfers. For example, the current running total resource indicator 692 may be calculated by adjusting an opening balance for any prior pending or posted transfers during the day. The current running total resource indicator 692 may correspond to the level of the running total resource indicator 634 at the current time. In the illustrated example, the current running total resources indicator 692 indicates a negative number, which indicates that borrowed resources are currently being used since all owned resources have been used.

A current reserved resources indicator 694 may display the current total amount of resources that have been reserved. The current reserved resources indicator 694 may correspond to the level of the reserved resources indicator 622 at the current time.

A current borrowed resource limit indicator 696 may indicate a current borrowed resource threshold. As noted previously, this threshold may be a limit that is defined by the entity operating the server 160. This represents the total amount of resources that the entity is making available to the entity that is associated with the entity account represented by the intraday resource availability interface 600.

In the example intraday resource availability interface 600 of FIG. 6, the current resource availability summary 680 is displayed together with an opening owned resource indicator 698. The opening owned resource indicator 698 indicates the level of resources at the start of the day (i.e., an opening balance of resources) and it may be used, for example, in determining the current running total resource indicator 692. A positive opening balance indicates that, at the start of the day, at least some owned resources were available and a negative opening balance may indicate that all owned resources were used and at least some borrowed resources were in use.

The indicators described above (both those in the resource usage graph 602 and those in the current resource availability summary 680) may be cumulative indicators for all storage locations for the entity that is associated with the intraday resource availability interface 600 being displayed. For example, they may account for resources associated with all storage locations in the entity account record 400 including, for example, a first storage location and a second storage location.

The intraday resource availability interface 600 may also include other indicators. For example, one or more indicators may be provided in a storage location-based summary 670. The storage location-based summary includes similar features as the current resources availability summary 680 but the storage location-based summary 670 displays data on a per-storage location basis rather than as aggregate totals across all storage locations.

The intraday resource availability interface 600 may include a widget configured to accept input to modify a parameter affecting the resource usage graph. Example widgets include a toggle widget 652$a$, 652$b$, 652$c$, 652$d$, 652$e$, 652$f$, 652$g$, 652$h$ which may be configured to toggle the display of an associated indicator. For example, when a particular indicator is displayed on the resource usage graph, the associated toggle widget may be selected to supress display of that indicator. For example, a borrowed resource limit toggle widget 652$a$ may be used to selectively display or supress display of the borrowed resource limit indicator 630. A borrowed resources used toggle widget 652b may be used to selectively display or supress display of the borrowed resources used indicator 624. An earmarked resources toggle widget 652c may be used to selectively display or supress display of the earmarked resources indicator 628. A reserved resources toggle widget 652d may be used to selectively display or supress display of the reserved resource indicator 622. A resource availability toggle widget 652e may be used to selectively display or supress display of the resource availability indicator 620. An intraday pending resource transfer toggle widget 652f may be used to selectively display or supress display of the intraday pending resource transfer indicator 626. An intraday posted transaction toggle widget 652g may be used to selectively display or supress display of the intraday posted transaction indicator 636. A running total resource toggle widget 652h may be used to selectively display or supress display of the running total resource indicator 634.

Conveniently, the toggle widgets may be useful, for example, to address problems that are inherent to computer displays. For example, such displays have limited screen area and expansion of screen area may be limited due, for example, to hardware limitations such as the availability of display ports on the client device 150. The toggle widget allows the same resource usage graph to be used to take different forms and allow for instant updating of the resource usage graph. For example, in at least some embodiments, activation of one of the widgets, such as one of the toggle widgets, causes the client device 150 to send a message to the server 160 requesting modification of the resource usage graph. The server 160 may prepare a modified resource usage graph based on the request and send it back to the client device 150 for display thereon. In other embodiments, the client device 150 may modify the resource usage graph in response to activation of the widget without further communicating with the server 160.

Another example of a widget may be a zoom widget 650 which is configured to accept input to modify a displayed time period associated with the resource usage graph. For example, the zoom widget 650 may allow for zooming in or out of the resource usage graph.

The intraday resource availability interface 600 may also include a position monitor 660. The position monitor 660 is configured to identify intraday peak position data 480. As noted previously, peak position data 480 may include peak credit position data and/or peak debit position data. That is, the position monitor 660 may identify the one or more top peak net credit and/or net debit positions. In the example, illustrated, the top five peak net credit and top five peak net debit positions are identified. For each peak position, an associated time is indicated. The time is the time when the peak position occurred. An amount associated with the peak position is also identified, together with a duration. The duration represents a duration of the peak (i.e., a length of time).

The intraday resource availability interface 600 may be a multi-screen interface in which at least some functionality is provided on display screens apart from the example display screen of FIG. 6. For example, the intraday resource availability interface 600 may include selectable interface elements 672 for toggling between various display screens provided by the resource availability interface 600 and each such screen may include a subset of features provided by the intraday resource availability interface 600. For example, selection of one of the selectable interface elements 672 may cause a resource prioritization screen to be displayed. An example resource prioritization screen is illustrated in FIG. 7.

The example resource prioritization screen provides particulars of a number of transfers, all of which are intraday transfers. For example, the resources prioritization screen may specify, for a given transfer, a reference number, a unique end-to-end transaction reference (UETR) which may act as a tracking number for cross border transfers, a quantity of resources, a unit indicator indicating the units of measurement of the resources (which is CAD or USD in the example), a status indicator, a recipient identifier, a sending identifier, and/or a priority status indicator.

Figure 7:
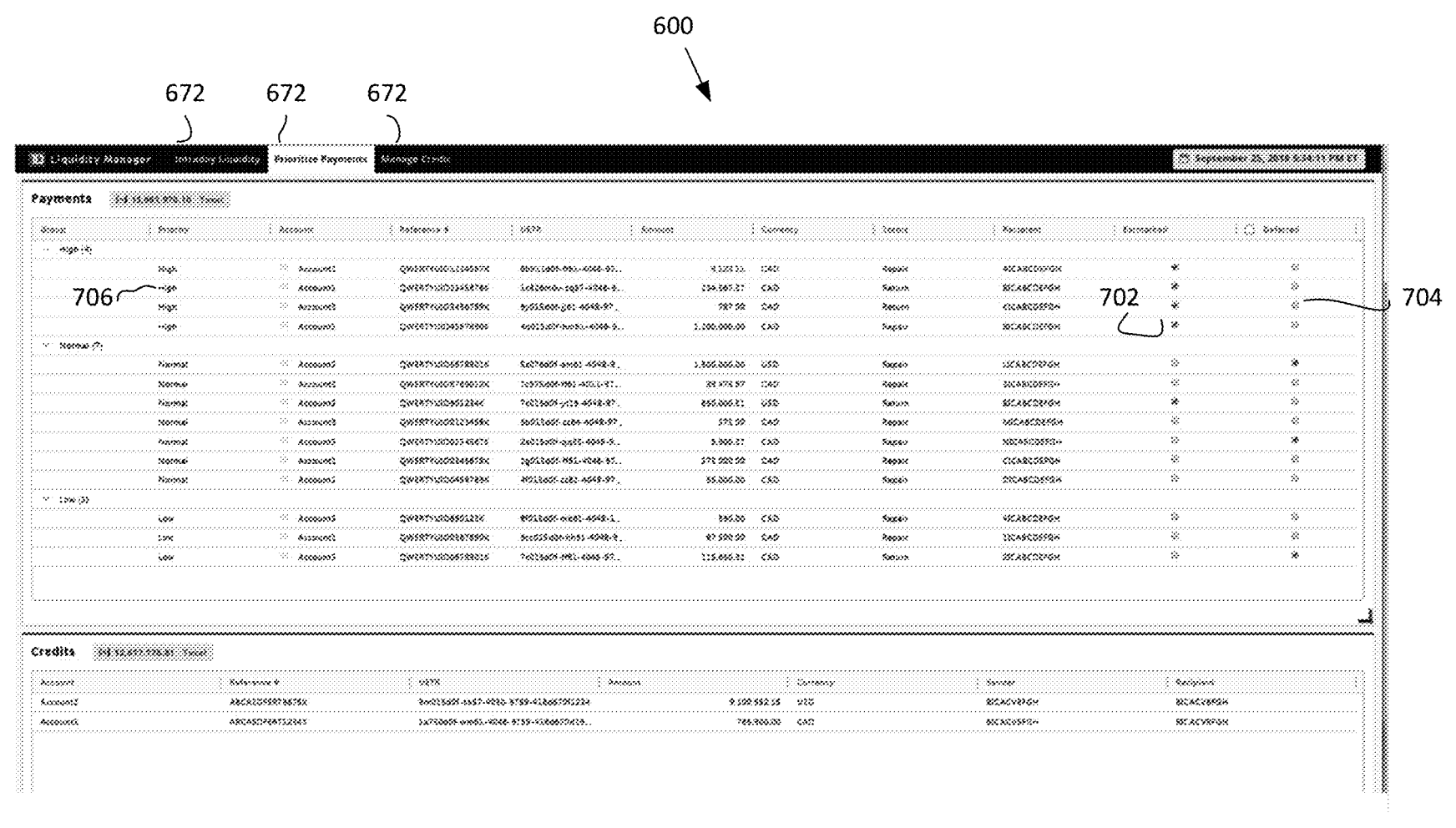

As illustrated in FIG. 7, the example screen of the intraday resource availability interface 600 may include a widget configured to accept input to modify a parameter, such as a parameter affecting the resource usage graph. The widget may, for example, be configured to receive a command that defines a processing condition that is to be applied for processing one or more of the transfers.

By way of example, an earmark widget 702 may be configured to accept input to reserve a portion of the borrowed resources for a particular transfer. The earmark widget 702 may, for example, be used to input an earmark command for a particular transfer. An earmark command may be used to configure the server 160 to reserve at least a portion of a borrowed resource balance (i.e., a portion that corresponds to the quantity of resources of the particular transfer) for the particular transfer. In the example, the earmark widget 702 may also be used to remove an earmark i.e., to input a command that causes the server 160 to remove the reservation of the portion of the borrowed resource balance for the particular transfer. In the example, the earmark widget 702 is a checkbox, but the earmark widget 702 may take other forms.

The example resource prioritization screen of FIG. 7 includes a defer widget 704. The defer widget 704 may be used to input a defer command for a transfer. The defer command is a processing condition that causes the associated transfer to be suspended so that it is not processed by the server 160 to complete the transfer until after the deferral is subsequently released. In the example, illustrated, the defer widget 704 also serves as a release widget which may be used to input a condition to remove a deferral of the transfer such that processing of that transfer resumes. That is, the release widget provides a selectable option to remove a processing condition. For example, the release widget may provide a selectable option to input a release command that removes a suspension previously applied to a transfer. In the example illustrated, the defer widget/release widget is a checkbox, but it may take other forms.

The example resource prioritization screen of FIG. 7 includes a prioritization widget 706. The prioritization widget 706 may be used to input a prioritization command. A prioritization command is associated with a processing condition that specifies a processing priority of at least one of the plurality of intraday transfers. The server 160, upon receiving such a command, configures processing of the associated transfer(s) according to the specified processing priority. Higher priority transfers are processed before lower priority transfers. In the example illustrated, the priority of a given transfer may be modified through a drag and drop gesture which selects a particular transfer, drags and drops it on a desired priority level. Other types of prioritization widgets 706 may, however, be used.

Figure 8:
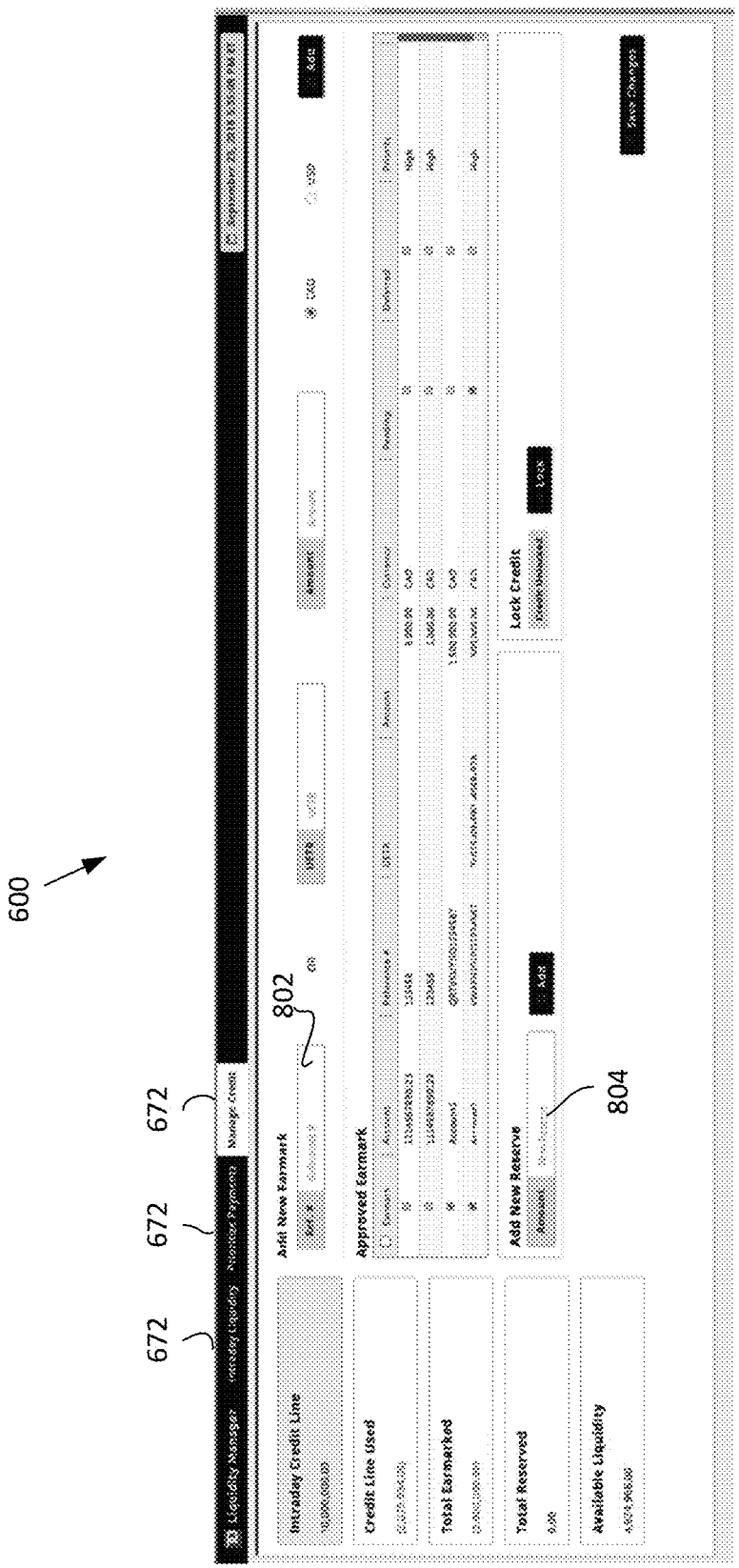
FIG. 8 is a further example display screen of an interface in accordance with an example embodiment.

A further example display screen of the intraday resource availability interface 600 is illustrated in FIG. 8. The display screen of FIG. 8 may be displayed in response to selection of an associated one of the selectable interface elements 672.

The example display screen of FIG. 8 is a borrowed resource management interface which includes particular functionality for managing the use of borrowed resources. For example, the example display screen includes a further earmark widget 802 that is configured to accept input to reserve a portion of the borrowed resources for a particular transfer. The example earmark widget 802 of FIG. 8 includes a textbox which allows for input of an identifier associated with a transfer, such as a unique identifier, UETR and/or an amount associated with the transfer. A listing of transfers that have previously earmarked is also listed and identifying data for such transfers is listed. Much like in the example of FIG. 7, the example display screen of FIG. 8 includes its own earmark widget and deferral widget to affect the listed transfers.

The example display screen of FIG. 8 includes a reserve resources widget 804. The reserve resources widget 804 may be used to input a command to the server 160 to set aside a particular amount of borrowed resources that are not to be used. That is, the reserve resources widget 804 may be used to input an instruction to the server to configure the server to modify a reserved borrowed resource amount 466 (FIG. 4).

The intraday resource availability interface 600 may include other features apart from those described above. For example, the intraday resource availability interface 600 may include one or more widgets for defining a processing condition 470 of the type described above with reference to FIG. 4; i.e., one that is to apply to any one or more transfer(s) that satisfy certain criteria. By way of example, a widget may allow for input of transfer identification information for identifying affected intraday transfers and an action that is to be applied to the affected intraday transfers. The processing condition 470 may include a threshold and an action and the threshold may be used to identify which of the transfers are to be processed according to the action. The action may be, for example, any of the processing conditions recited previously (e.g., a defer processing condition, a prioritization processing condition, an earmark processing condition, or a processing condition of another type). The processing condition may specify a comparison operation associated with the threshold. The comparison operation may, for example, be a greater than (>), less than (<), equal to (==), greater than or equal to (>=), or less than or equal to (<=) operation. By way of example, the processing condition may specify that the action is to apply to any transactions that are greater than the threshold. By way of further example, the processing condition may specify that the action is to apply to any transactions that are less than the threshold.

By way of further example, a sharing widget may be configured to receive input to send at least some data represented on the intraday resource availability interface to another computer system, such as another client device. In response to receiving input through the sharing widget, the server 160 may automatically send a message to the other computer system. The message may include data represented on the intraday resource availability interface. For example, a user may wish to send data associated with the position monitor 660 to another computer system since such data may be useful for certain reporting requirements. The sharing widget may facilitate such an operation.

The intraday resource availability interface 600 of FIGS. 6 to 8 may also be referred to as an intraday transfer interface or an intraday transfer management interface since display screens provided by the interface may, as illustrated in FIGS. 7 and 8, identify specific transfers and provide functions for managing such transfers.

Referring again to FIG. 5, in providing the intraday resource availability interface 600 at operation 502, the server 160 may obtain data necessary to generate the interface. The data may, for example, be obtained from the entity account record 400. For example, the intraday resource status data 490 may be obtained. The server 160 may calculate or otherwise determine other data that is necessary to generate the interface and the server 160 may update the entity account record 400 to include certain data that is determined at operation 502 that is not yet stored in the entity account record 400.

At operation 504, the server 160 may detect a transfer of value associated with one or more account associated with the authenticated entity. The one or more account may, for example, represent storage locations. That is, the server 160 may detect a transfer of resources into or from one or more of the storage locations (such as the first storage location that is associated with the first storage location data 402 or the second storage location that is associated with the second storage location data 404). The transfer may be an incoming transfer or an outgoing transfer.

At operation 506, the server determines an updated available resource amount based on the detected transfer of value. That is, the transfer is one that affects the amount of available resources and so the available resource amount is updated to account for the transfer. If the transfer is an incoming transfer, the available resource amount increases while, if the transfer is an outgoing transfer, the available resource amount decreases. The update at operation 506 may include adjusting a prior available resource amount based on an amount associated with the detected transfer.

At operation 508, the server 160 sends, via the communications module and to the client device, an updated resource availability interface. The updated resource availability interface may, for example, be similar to the resource availability interface 600 of FIG. 6 but it may be updated based on the transfer. For example, the updated resource availability interface may be updated to include or reflect the updated available resource amount. The resource availability indicator 620 may be updated to include or reflect the updated available resource amount (and upon such updating may be referred to as an updated resource availability indicator). Other indicators may also be updated to account for the transfer. For example, any one or a combination of the following may be updated: current borrowed resources used indicator 684, current earmarked resources indicator 686, current available resource indicator 682, current intraday pending resource transfer indicator 688, current intraday posted resource transfer indicator 690, current running total resource indicator 692, running total resource indicator 634, reserved resource indicator 622, borrowed resources used indicator 624, intraday pending transfer indicator 626, the earmarked resource indicator 628, and/or any one or more indicators of the storage location-based summary 670.

At operation 510, the server 160 may receive input via a widget provided on the updated resource availability interface. Such input may be received at the server 160 via the communications module. That is, the server 160 may receive, via the communications module and from the client device, a signal representing a command. The command may be a command or operation of a type referenced with respect to a widget described above and the server 160 may, in response to receiving the command, perform an associated action and/or, at operation 512, update the resource availability interface 600 based on the input.

By way of example, the widget used to input the command may be a reserve resources widget 804 and the command may be a command to set aside a particular amount of borrowed resources that are not to be used. That is, the reserve resources widget 804 may be configured to accept input to reserve a portion of the borrowed resources and the server 160 may, at operation 510, receive, via the communications module and from the client device, a command to reserve a portion of the borrowed resources. The command may be sent from the client device to the server computer system responsive to input received through the widget. Then, in response to receiving the command, the server 160 may update the available resource amount. That is, the server 160 may determine a further updated available resource amount based on the reserved portion of the borrowed resources specified in the command. Then, at operation 512, the server 160 may send, via the communications module and to the client device, a further updated resource availability interface. The further updated resource availability interface is similar to the resource availability interface 600 of FIG. 6 but it has been updated to include a further updated resource availability indicator based on the further updated available resource amount. That is, the resource availability indicator 620 may be updated to, for example, add a further data point reflecting the available resources after the reserved amount is taken into account. Other affected indicators may also be updated including, for example, the current available resource indicator 682. Notably, the updating may be made in real time or near real time despite the fact that the client device is remote from the server and the fact that numerous indicators may be affected. The computing systems (e.g., the server and client device) make possible such features.

The input received at operation 510 may be input that is received through a widget of another type and the updating of the resource availability interface 600 may be based on the nature of the widget. For example, when the input was received through a toggle widget 652a, 652b, 652c, 652d, 652e, 652f, 652g, 652h, then the resource usage graph 602 may be updated to toggle display of the associated indicator. For example, the resource usage graph 602 may be updated to supress display of the resource availability indicator.

By way of further example, when the input is received through a zoom widget 650, the resource usage graph 602 may be modified to change a displayed time period associated with the resource usage graph. For example, where the command is a request to zoom in, the time period may be limited from the currently displayed time period and when the command is a request to zoom out, the time period may be expanded from the currently displayed time period.

By way of further example, when the input is received through an earmark widget 702, 802, then the resource usage graph 602 may be updated to modify one or more of the indicators that take earmarked resources into consideration including, for example, the earmarked resource indicator 628, the current earmarked resources indicator 686, the resource availability indicator 620 and/or the current available resource indicator 682 (which may also be referred to as a current resource availability indicator).

Responsive to receiving input through a widget, the server 160 may also update associated data in the record 400 (FIG. 4).

Accordingly, the server 160 and the client device 150 may cooperate to provide a dynamic display. The display is dynamic in that it is constantly being updated to ensure it displays fresh data.

Figure 9:
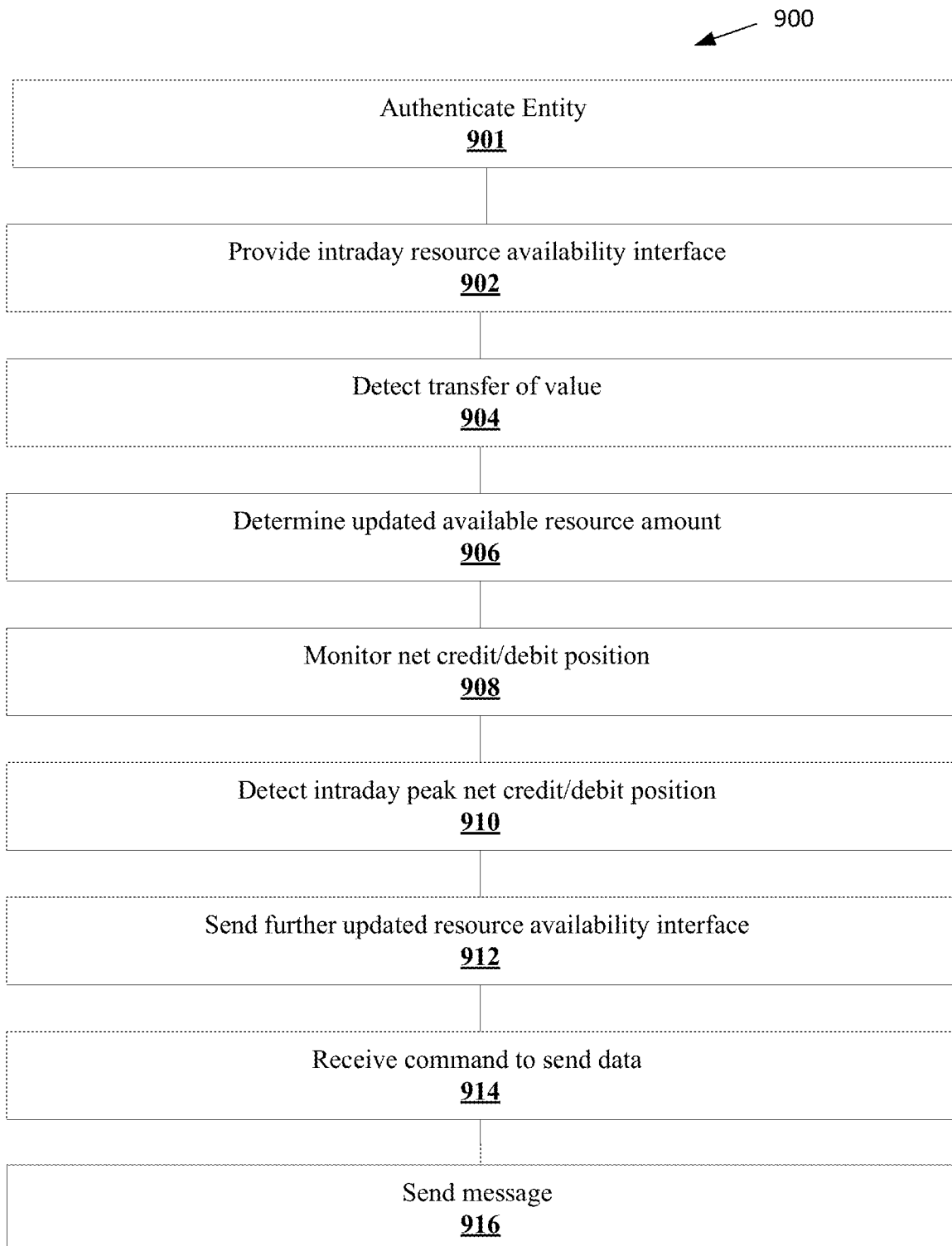
FIG. 9 is a flowchart of an example method in accordance with an example embodiment of the present disclosure.

Referring now to FIG. 9, a flowchart showing example operations performed by a server 160 is illustrated. The operations may be included in a method 900 which may be performed by the server 160. For example, computer-executable instructions stored in memory of the server 160 may, when executed by a processor of the server 160, configure the server 160 to perform the method 900 or a portion thereof. Operations 901 to 906 of the method 900 may correspond to operations 901 to 906 of the method 500 of FIG. 5.

At operation 908, the server 160 monitors a net credit position and/or a net debit position. The net credit/debit positions are monitored based on intraday transfers into and out of the accounts (i.e., the storage locations that store owned resources for the entity). At operation 910, the server 160 may detect an intraday peak net credit/debit position. In at least some embodiments, the server 160 may track multiple peak positions for both credit and debit. For example, the server may track the top five peak credit positions and top five peak debit positions for the day. Accordingly, detecting a "peak" credit/debit position may include detecting that a current credit or debit position is higher than the lowest of the existing top five peak credit or debit positions (which may be reflected in the peak position data 480). The server 160 may determine a length or duration of the peak position and/or a time of the peak position.

At operation 912, in response to detecting the intraday peak net credit/debit position, the server 160 sends, via the communications module and to the client device, a further updated resource availability interface. The further updated resource availability interface includes the detected intraday peak net credit position. For example, the position monitor 660 may be updated to include the detected peak net credit/debit position. Further, peak position data 480 in the entity account record 400 (FIG. 4) may be updated to reflect the identified peak. The server 160 may also update the peak position data 480 in the record 400.

At operation 914, the server 160 may receive, via the communications module and from the client device, a signal representing a command to send data, such as the peak net credit/debit position (i.e., the peak position data 480). For example, a sharing widget may be configured to receive input to send at least some data represented on the intraday resource availability interface to another computer system, such as another client device. In response to receiving input through the sharing widget, the server 160 may (at operation 916) automatically send a message to the other computer system. The message may contain the data associated with the received command.

Figure 10:
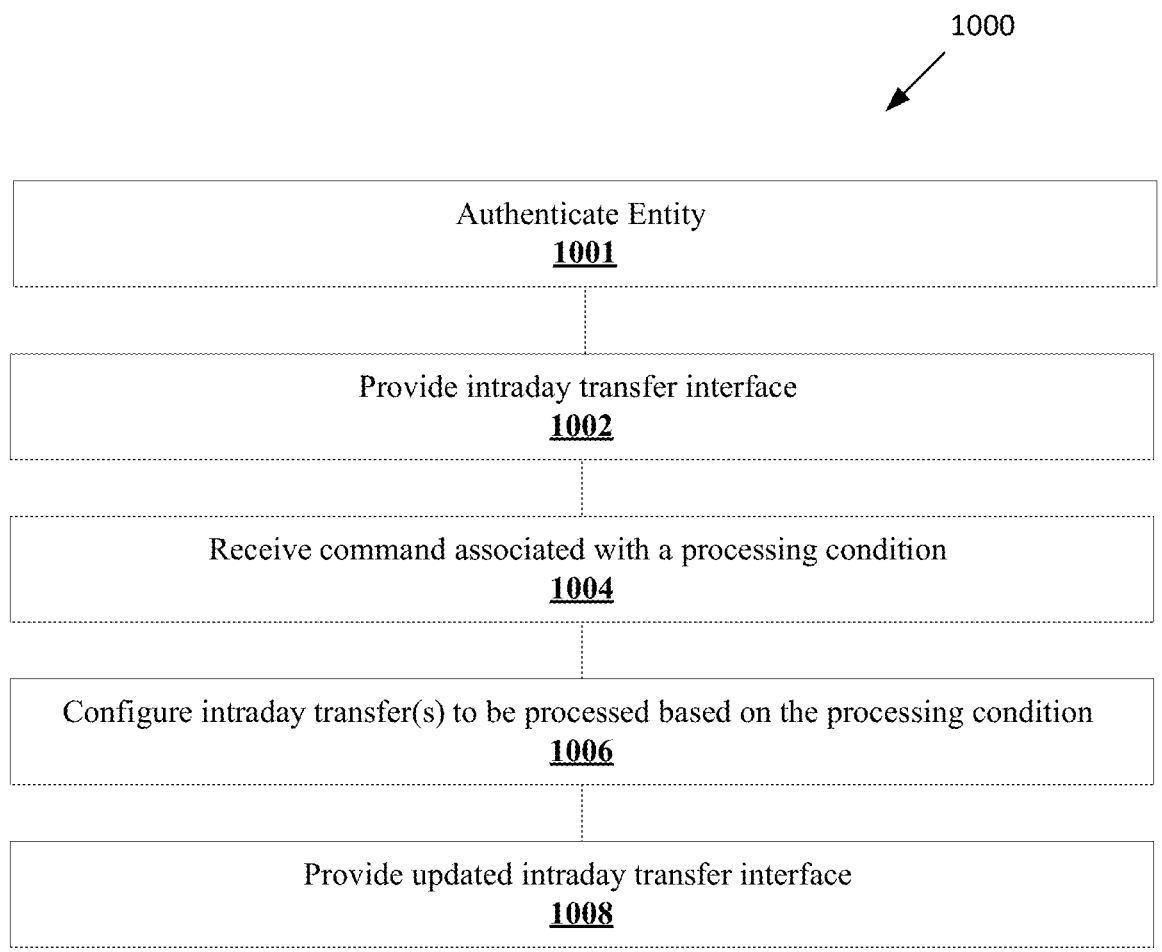
FIG. 10 is a flowchart of an example method in accordance with an example embodiment of the present disclosure.

Referring now to FIG. 10, a flowchart showing example operations performed by a server 160 is illustrated. The operations may be included in a method 1000 which may be performed by the server 160. For example, computer-executable instructions stored in memory of the server 160 may, when executed by a processor of the server 160, configure the server 160 to perform the method 1000 or a portion thereof.

At operation 1001, the server 160 authenticates the entity. Operation 1001 may be performed in the manner described above with respect to operation 501 of the method 500 of FIG. 5.

At operation 1002, the server 160 provides, via the communications module and to a client device associated with an authenticated entity, an intraday transfer interface. The intraday transfer interface may identify a plurality of intraday transfers for the authenticated entity. By way of example, the display screen of FIG. 7 may be displayed or the display screen of FIG. 8 may be displayed. The intraday transfer interface, which may also be referred to as an intraday resource availability interface 600, includes one or more widgets for managing processing of one or more of the identified intraday transfers. For example, an earmark widget 702, 802, prioritization widget 706, defer widget 704, release widget (which may provide a selectable option to remove the processing condition such as a deferral processing condition input through the defer widget), and/or reserve resources widget 804 may be provided on the intraday transfer interface.

At operation 1004, the server 160 may receive, via the communications module and from the client device, a signal representing a command input through the intraday transfer interface. The command may, for example, be input through the widget. The command may be associated with a processing condition for at least one of the plurality of intraday transfers.

In response to receiving the command, the server 160 may configure one or more of the intraday transfers to be processed based on the processing condition associated with the command (at operation 1006).

The command received at operation 1004 may be a defer command having a processing condition that causes the associated intraday transfer(s) to be suspended. In response to receiving such a command, the server may, at operation 1006, suspend processing of the associated transfer(s). Such processing may remain suspended until a release command is received which removes the suspension. The release command may be received via a widget which provides a selectable option to remove a processing condition, such as a release widget that provides a selectable option to input a release command to remove the suspension.

The command received at operation 1004 may be a prioritization command. The prioritization command is associated with a processing condition that specifies a processing priority of one or more of the intraday transfers. By way of example, a prioritization widget may be engaged to configure a transfer to be processed with "high", "medium" or "low" priority. At operation 1006, the server 160 may configure a transfer to be processed in accordance with a priority level specified by or in association with the prioritization command. That is, the server 160 may configure the affected intraday transfer(s) to be processed according to the specified processing priority.

The command received at operation 1004 may be an earmark command. For example, the authenticated entity may be associated with an account having a record in a database and the record may reflect a borrowed resource balance. The borrowed resource balance may indicate an amount of borrowed resources that are available. This may include borrowed resources that have not been previously used, reserved or earmarked. When an earmark command is received through interaction with the earmark widget, the server 160 may, at operation 1006, configure one or more associated intraday transfers to be processed based on the processing condition by reserving at least a portion of the borrowed resource balance for such associated intraday transfers (which may be referred to as earmarked transfers). That is, the server 160 may set aside a portion of the borrowed resources and may only use that set aside portion to process the earmarked transfer(s).

In some implementations, the command received at operation 1004 may define a processing condition that includes or is associated with a rule that may be used by the server 160 to identify affected transactions and an action to be applied to such transactions. By way of example, the processing condition may include a threshold and an action and the threshold may be used to identify which of the transactions are to be processed according to the action. The action may be, for example, any of the processing conditions recited previously (e.g., a defer processing condition, a prioritization processing condition, an earmark processing condition, or a processing condition of another type). The processing condition may specify a comparison operation associated with the threshold. The comparison operation may, for example, be a greater than (>), less than (<), equal to (==), greater than or equal to (>=), or less than or equal to (<=) operation. By way of example, the processing condition may specify that the action is to apply to any transactions that are greater than the threshold. By way of further example, the processing condition may specify that the action is to apply to any transactions that are less than the threshold. At operation 1006, the server 160 may identify affected transaction(s) based on the processing condition and may configure such transactions to be processed based on the action. For example, the server 160 may, for at least one of the plurality of intraday transfers, compare a value associated with that intraday transfer to the threshold and, based on the comparison, selectively configure that intraday transfer to be processed according to the action.

The rule that may be used by the server 160 to identify affected transactions may take other forms apart from a threshold. For example, the processing condition may include transfer identification information for identifying affected intraday transfers and an action to be applied to the affected intraday transfers. The actions may be of the type described above. The transfer identification information may, for example, specify reference number criteria. In at least some such embodiments, at operation 1006, the server 160 may, for at least one of the plurality of intraday transfers that have been previously configured (and may be included on the intraday transfer interface), determine, based on the transfer identification information, that the action is to be applied to that intraday transfer. For example, the server may compare at least a portion of a reference number for the intraday transfer with the transfer identification information to determine that the action is to be applied to that intraday transfer. For example, the transfer identification information may specify a pattern or string of characters that is to be included in a reference number for affected transfers so that any transfers having such a pattern/string will be automatically processed in accordance with the action. In response to determining that the action is to be applied to the intraday transfer, the server configures that intraday transfer based on the action.

Other criteria for identifying affected transfers may be used instead of or in addition to the criteria specifically noted herein.

Once a rule has been defined for identifying transfers that are to be automatically processed according to an action, the identification of affected transfers may be ongoing. As transfers are added or created, they may be automatically processed according to the action if they satisfy the criteria defined for the rule (such as if they are on a particular side of the threshold).

Operation 1006 may include saving data such as a processing condition 470 to the entity account record 400.

At operation 1008, the server may provide, via the communication module and to the client device, an updated intraday transfer interface indicating processing of the transfer(s) according to the processing condition.

The server 160 may continue to process affected transfers in accordance with the processing condition.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system comprising:
a communications module;
a processor coupled to the communications module; and
a memory storing processor-executable instructions which, when executed, configure the processor to:
receive, via the communications module and from a client device, authentication credentials;
identify one or more accounts based on the authentication credentials and determine that the authentication credentials are valid;
when it is determined that the authentication credentials are valid, provide, via the communications module and to the client device, an intraday resource availability interface, the intraday resource availability interface including a resource usage graph for the one or more accounts and a position monitor, the resource usage graph having a time axis including a time period that includes a day start time and a current time, the resource usage graph including a resource availability indicator indicating a total amount of resources over the time period, including borrowed resources, available for use in association with the one or more accounts, the position monitor identifying intraday peak position data by automatically monitoring intraday transfers into and out of the one or more accounts, determining differences between resources transferred into and resources transferred out of the one or more accounts from the day start time up until the current time, and identifying one or more maximum net credit positions and one or more maximum net debit positions based on the determined differences, and displaying the intraday peak position data adjacent to the resource usage graph, the intraday resource availability interface including one or more widgets configured to accept input to modify a parameter affecting the resource usage graph, the one or more widgets including at least one toggle widget configured to selectively display or supress display of an associated indicator and configured to receive input to send at least some data represented on the intraday resource availability interface;
responsive to activation of the one or more widgets:
receive, via the communications module and from the client device, a message requesting modification of the resource usage graph;
generate a modified resource usage graph based on the request; and
send the modified resource usage graph to the client device for display thereon;
detect a transfer of value associated with the one or more account;
determine an updated available resource amount based on the detected transfer of value;
send, via the communications module and to the client device, an updated resource availability interface, the updated resource availability interface including an updated resource availability indicator based on the determined updated available resource amount;
receive, via the communications module and from the client device, a signal representing a command to send the peak position data to another computer system; and
send, via the communications module and to the other computer system, a message containing the peak position data.

2. The server computer system of claim 1, wherein the toggle widget is configured to selectively display or suppress display of the resource availability indicator.

3. The server computer system of claim 1, wherein the one or more widgets include a widget configured to accept input to modify a displayed time period associated with the resource usage graph.

4. The server computer system of claim 1, wherein the one or more widgets include a widget configured to accept input to reserve a portion of the borrowed resources and wherein the instructions further configure the processor to:
receive, via the communications module and from the client device, a command to reserve a portion of the borrowed resources, the command sent from the client device to the server computer system responsive to input received through the widget;
determine a further updated available resource amount based on the reserved portion of the borrowed resources; and
send, via the communications module and to the client device, a further updated resource availability interface, the further updated resource availability interface including a further updated resource availability indicator based on the further updated available resource amount.

5. The server computer system of claim 1, wherein the intraday resource availability interface further includes a current resource availability summary displayed together with the resource usage graph, the current resource availability summary displaying a current available resource amount.

6. The server computer system of claim 5, wherein the current resource availability summary includes a current borrowed resource limit indicator indicating a current borrowed resource threshold.

7. The server computer system of claim 1, wherein the resource usage graph further includes a borrowed resource limit indicator indicating a borrowed resource threshold over the time period.

8. The server computer system of claim 1, wherein the instructions further configure the processor to:
identify a new maximum net credit position based on the automatic monitoring; and
send, via the communications module and to the client device, a further updated resource availability interface, the further updated resource availability interface including the newly identified maximum net credit position.

9. The server computer system of claim 1, wherein the instructions further configure the processor to:
identify a new maximum net debit position based on the automatic monitoring; and
send, via the communications module and to the client device, a further updated resource availability interface, the further updated resource availability interface including the newly identified maximum net debit position.

10. The server computer system of claim 1, wherein the peak position data includes a plurality of peak positions and the position monitor displays, for each peak position, a time associated with each peak position and an amount associated with each peak position.

11. A method performed at a server, the method comprising:
receiving, via the communications module and from a client device, authentication credentials;
identifying one or more accounts based on the authentication credentials and determining that the authentication credentials are valid;
when it is determined that the authentication credentials are valid, providing, to the client device, an intraday resource availability interface, the intraday resource availability interface including a resource usage graph for the one or more accounts and a position monitor, the resource usage graph having a time axis including a time period that includes a day start time and a current time, the resource usage graph including a resource availability indicator indicating a total amount of resources over the time period, including borrowed resources, available for use in association with the one or more account, the position monitor identifying intraday peak position data by automatically monitoring intraday transfers into and out of the one or more accounts, determining differences between resources transferred into and resources transferred out of the one or more accounts from the day start time up until the current time, and identifying one or more maximum net credit positions and one or more maximum net debit positions based on the determined differences and displaying the intraday peak position data adjacent to the resource usage graph, the intraday resource availability interface including one or more widgets configured to accept input to modify a parameter affecting the resource usage graph, the one or more widgets including at least a toggle widget configured to selectively display or supress display of an associated indicator and configured to receive input to sent at least some data represented on the intraday resource availability interface;
responsive to activation of the one or more widgets:
receiving, from the client device, a message requesting modification of the resource usage graph;
generating a modified resource usage graph based on the request; and
sending the modified resource usage graph to the client device for display thereon;
detecting a transfer of value associated with the one or more account;
determining an updated available resource amount based on the detected transfer of value;
sending, to the client device, an updated resource availability interface, the updated resource availability interface including an updated resource availability indicator based on the determined updated available resource amount
receiving, from the client device, a signal representing a command to send the peak position data to another computer system; and
send, to the other computer system, a message containing the peak position data.

12. The method of claim 11, wherein the toggle widget is configured to selectively display or suppress display of the resource availability indicator.

13. The method of claim 11, wherein the one or more widgets include a widget configured to accept input to modify a displayed time period associated with the resource usage graph.

14. The method of claim 11, wherein the one or more widgets include a widget configured to accept input to reserve a portion of the borrowed resources and wherein the method further includes:
receiving, from the client device, a command to reserve a portion of the borrowed resources, the command sent from the client device to the server responsive to input received through the widget;
determining a further updated available resource amount based on the reserved portion of the borrowed resources; and
sending, to the client device, a further updated resource availability interface, the further updated resource availability interface including a further updated resource availability indicator based on the further updated available resource amount.

15. The method of claim 11, wherein the intraday resource availability interface further includes a current resource availability summary displayed together with the resource usage graph, the current resource availability summary displaying a current available resource amount.

16. The method of claim 15, wherein the current resource availability summary includes a current borrowed resource limit indicator indicating a current borrowed resource threshold.

17. The method of claim 11, wherein the resource usage graph further includes a borrowed resource limit indicator indicating a borrowed resource threshold over the time period.

18. The method of claim 11, wherein the method further comprises:
identify a new maximum net credit position based on the automatic monitoring; and
sending, to the client device, a further updated resource availability interface, the further updated resource availability interface including the newly identified maximum net credit position.

19. The method of claim 11, wherein the peak position data includes a plurality of peak positions and the position monitor displays, for each peak position, a time associated with each peak position and an amount associated with each peak position.

20. A non-transitory computer readable storage medium comprising processor-executable instructions which, when executed, configure a processor to:

receive, via a communications module and from a client device, authentication credentials;

identify one or more accounts based on the authentication credentials and determine that the authentication credentials are valid;

when it is determined that the authentication credentials are valid, provide, to the client device, an intraday resource availability interface, the intraday resource availability interface including a resource usage graph for the one or more account and a position monitor, the resource usage graph having a time axis including a time period that includes a day start time and a current time, the resource usage graph including a resource availability indicator indicating a total amount of resources over the time period, including borrowed resources, available for use in association with the one or more account, the position monitor identifying intraday peak position data by automatically monitoring intraday transfers into and out of the one or more accounts, determining differences between resources transferred into and resources transferred out of the one or more accounts from the day start time up until the current time, and identifying one or more maximum net credit positions and one or more maximum net debit positions based on the determined differences and displaying the intraday peak position data adjacent to the resource usage graph, the intraday resource availability interface including one or more widgets configured to accept input to modify a parameter affecting the resource usage graph, the one or more widgets including at least one toggle widget configured to selectively display or supress display of an associated indicator and configured to receive input to send at least some data represented on the intraday resource availability interface;

responsive to activation of the one or more widgets:
  receive, via the communications module and from the client device, a message requesting modification of the resource usage graph;
  generate a modified resource usage graph based on the request; and
  send the modified resource usage graph to the client device for display thereon;

detect a transfer of value associated with the one or more account;

determine an updated available resource amount based on the detected transfer of value;

send, to the client device, an updated resource availability interface, the updated resource availability interface including an updated resource availability indicator based on the determined updated available resource amount;

receive, via the communications module and from the client device, a signal representing a command to send the peak position data to another computer system; and send, via the communications module and to the other computer system, a message containing the peak position data.

* * * * *